United States Patent [19]
Palmer

[11] B 3,990,737
[45] Nov. 9, 1976

[54] RESILIENT MOUNTING MEANS FOR A PROTECTION CAB OR THE LIKE

[75] Inventor: Richard D. Palmer, Decatur, Ill.

[73] Assignee: Caterpillar Tractor Co., Peoria, Ill.

[22] Filed: Feb. 19, 1974

[21] Appl. No.: 443,647

[44] Published under the second Trial Voluntary Protest Program on February 17, 1976 as document No. B 443,647.

[52] U.S. Cl. .............................. 296/35 R; 296/28 C
[51] Int. Cl.² ....................................... B62D 27/04
[58] Field of Search ....................... 296/35 R, 28 C; 267/63 R

[56] References Cited
UNITED STATES PATENTS

| | | | |
|---|---|---|---|
| 2,051,022 | 8/1936 | Bugatti | 296/35 R |
| 2,144,170 | 6/1937 | Utz et al. | 296/35 R |
| 2,838,339 | 6/1958 | Schaldenbrand | 296/35 R |
| 3,321,236 | 5/1967 | Sewelin | 296/35 R |
| 3,390,914 | 7/1968 | Sewelin | 296/35 R |
| 3,479,081 | 11/1969 | Schaaf | 296/35 R |
| 3,797,604 | 3/1974 | Davis | 296/35 R |
| 3,831,704 | 8/1974 | Zuege | 296/35 R |

FOREIGN PATENTS OR APPLICATIONS

| | | | |
|---|---|---|---|
| 5,503 | 2/1889 | United Kingdom | 296/35 R |

*Primary Examiner*—Robert J. Spar
*Assistant Examiner*—Donald W. Underwood
*Attorney, Agent, or Firm*—Phillips, Moore, Weissenberger, Lempio & Strabala

[57] ABSTRACT

A resilient, cushioned fastening device for mounting protective cabs and the like on a vehicle, comprising a rubber-like base pad disposed between the vehicle and the cab for cushioning same, securing means in the form of a bolt and large washer for holding the cab securely on the vehicle over said base pad, with resilient cushioning means in the form of a bushing on said securing means formed to provide a complete dampening barrier between the cab and main body of the vehicle. The cushioning means is formed with an upper flange portion fitting under a large washer for completing dampened restraints against vertical vibrations, with the entire structure being made strong enough to hold the cab in place in the event of overturning or wrecking.

4 Claims, 3 Drawing Figures

RESILIENT MOUNTING MEANS FOR A PROTECTION CAB OR THE LIKE

BACKGROUND OF THE INVENTION

The present invention relates to improvements in a resilient mounting means for a protection cab and the like, and more particularly, to a cushioned fastening device for mounting protective cabs in which the cab is completely cushioned from the vehicle throughout substantially the entire solid contact area.

It is well known that earth working vehicles and the like are subject to rather extreme vibrational forces during operation, and that these forces are a source of considerable discomfort to the operator. In addition, operator protection standards are provided by law, and recent Federal legislation has provided even more stringent limitations upon the noise level to which operators are exposed. Since sound and other vibrations are readily transmitted through metal-to-metal contact, it is important to provide a cab for the operator in which metal-to-metal contact between the cab and the main body of the vehicle is substantially eliminated. It is also desirable to achieve this end in a construction which also provides adequate protection for the operator against turnover and the like, as well as providing a construction which is comparatively simple in fabrication and assembly, and reliable in operation.

SUMMARY OF THE INVENTION

It is therefore a primary object of the invention to provide a cushioned fastening device for mounting protective cabs and the like on a vehicle with resilient mounting means, in which the protective cab is substantially completely isolated from the vehicle by cushioning members formed to absorb vibrational force in both horizontal and vertical directions, yet which members are combined with a fastening means in such a way that a strong metal-to-metal contact occurs in the event of a turnover or the like.

Another object of the invention is to provide a resilient mounting means for a protective cab or the like of the character described, in which the device is relatively simple in design, easily constructed and assembled, and reliable in operation.

Another object of the invention is to provide a cushion fastening device of the character described, in which parts are easily replaced and proper maintenance is simplified.

Further objects and advantages of the invention will become more apparent as the specification progresses.

In accordance with the present invention, a cushioned fastening device for mounting protective cabs and the like on a vehicle is provided, which comprises a rubber-like base pad disposed between the vehicle and the cab, securing means for holding the cab securely in place on the vehicle and over said base pad, and resilient cushioning means on said securing means formed to provide a complete dampening barrier between the cab and the main body of the vehicle. In general, the rubber-like base pad is formed to fit under a large area at or near the periphery of the floor of the cab, and therefore provides a rather large supporting surface, so that excessive pressures in certain areas are avoided. In this way, the base pad provides excellent supporting characteristic, while at the same time it is constructed to absorb considerable dampening vibrations that would otherwise pass from the vehicle to the cab.

In order to hold the cab in place on the vehicle over the base pad, securing means are provided which are capable of maintaining the cab in position under severe stress conditions such as turnovers or wreckage. In order to avoid normal metal-to-metal contact at and through the securing means, resilient cushioning means are provided on said securing means and formed to provide a complete dampening barrier between the cab and securing means. In other words, the securing means, which are preferably in the form of bolts, are attached to the main body of the vehicle by being threaded therein or the like, and therefore vibrate along with the vehicle. The cushioning means are not only formed around the securing means in order to provide a barrier against horizontal vibrations, but also the cushioning means has a flanged portion at its upper end to cushion against vertical vibrations at the secured connection. In order to provide sufficient strength for the connection, and to maintain the securing means under heavy stress, a large washer or equivalent is provided to fit over the flange portion of the cushioning means and minimize pressure by enlarging the area. In addition, this large washer is formed to fit in rather close proximity to the strong frame portion of the cab so that upon turnover or the like, the washer may quickly contact the strong metal frame and hold the unit in position. This construction is important, because the cushioning means will necessarily fail by extruding under the extreme forces caused by turnover or the like, and cannot be relied upon to hold the cab in position under such conditions.

It will also be appreciated that the preferred securing means is in the form of a bolt having a large bolt head and washer assembly, which may be easily replaced in the event the same is bent or damaged during operation. In addition, the resilient cushioning means is also provided in separate units so that the same may be replaced when damaged or destroyed by a turnover or the like.

Another feature of the invention is the provision of a bushing in combination with a resilient cushioning means to provide a controlled clamping force on the resilient cushioning means, and in addition, to provide a strong metal-to metal tightening stop, so as to protect the flanged portion of the resilient cushioning means from overtightening of the bolt securing means.

BRIEF DESCRIPTION OF THE DRAWINGS

The preferred forms of the invention are illustrated in the accompanying drawings forming a part of this description in which.

While only the preferred forms of the invention are shown, it should be understood that various changes or modifications may be made within the scope of claims attached hereto without departing from the spirit of the invention.

DETAILED DESCRIPTION OF A PREFERRED EMBODIMENT

Figure 1:
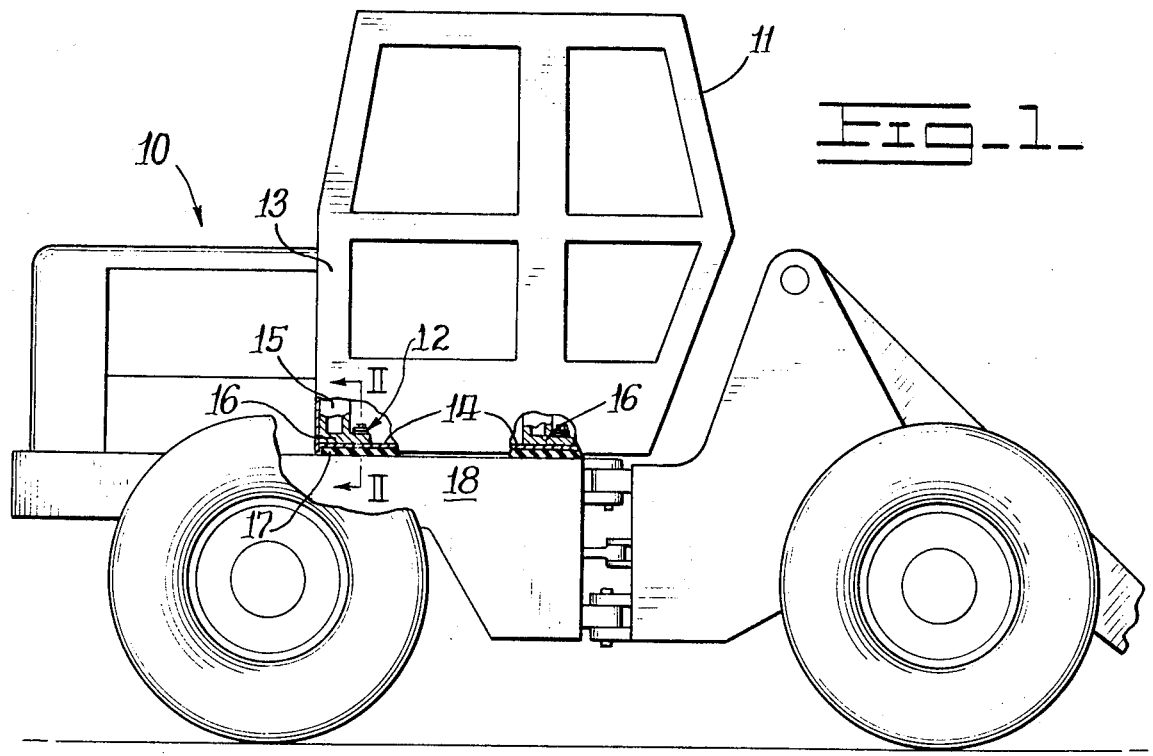
FIG. 1 is a side elevational view of a vehicle constructed in accordance with the present invention with parts broken away to illustrate internal structure.

Referring to the drawings in greater detail, there is shown in FIG. 1 a typical earth working vehicle 10 having a cab 11 mounted thereon by means of a cushioned fastening device 12. The cab 11 is an integrally constructed unit, which is preferably completely closable, and built for operator protection. Thus the cab will comprise a metal body 13 having a floor 14. Body 13 is provided with a plurality of upright legs 15 having a plurality of horizontal extending flange members 16 located at the lower ends thereof for accommodating the fastening device 12.

Fastening device 12 comprises a rubber-like base pad 17 disposed between the floor plate 14 and main frame 18 of the vehicle 10. The base pad 17 will extend between substantially all areas of contact between the floor 14 and any frame members of the vehicle so as to provide a relatively large cushioned area and minimize forces at any specific location. In order to hold cab 11 securely in place on the vehicle 10, device 12 also comprises a plurality of bolts 19 which are received in suitable threaded bores 20 of frame 18. Bolts 19 are fitted through oversized holes 21 of flange 16 and oversized holes 22 of floor 14 as well as hole 23 of base pad 17. Holes 21, 22 and 23 are sized to receive a cylindrical and resilient bushing assembly 24, which comprises a cylindrical spacer 25 having a rubber bushing 26 bonded to its outer periphery.

As here shown, bushing 25 is formed to fit within the hole 23 of rubber base pad 17, and the rubber bushing 26 is formed to fit within hole 21 of flange member 16 and hole 22 of floor 14. Rubber bushing 26 also has a flange 27 formed to fit in a recess 28 of flange member 16. It should be noted that the hole 21 is machine bored and recess 28 is accurately formed so that bushing 27 fits tightly in place, whereas hole 22 of floor 14 is made oversize for easy assembly. Cushioned fastening device 12 is completed by a thick washer 29 which bears against the cylindrical spacer 25 and the flanged end of bushing 26. In this way, bolt 19 and thick washer 29 bears against spacer 25 and is strongly clamped into position in main frame 18 so as to provide an exceedingly sturdy anchor for the cab. In addition, bushing 26 is sized so that it is pre-compressed between thick washer 29 and the floor of recess 28 for completing the cushion against vertical vibrations that may be communicated through the bolt and yet provide a firm grip on the cab.

It will be noted that thick washer 29 and flange member 16 are rather closely spaced, and the washer is made strong so that upon vehicle overturning or the like, the washer can bear against the flange directly and hold the cab securely in place, in the event such undue forces are sufficient to extrude rubber from bushing 26. It will also be noted that the bushings and associated structures are easily replaced in the event of damage from such overturning, and this feature facilitates maintenance of the vehicle.

Assembly of the cab onto the vehicle is a relatively simple operation, and comprises the steps of first bonding the rubber base pad 17 to the floor 14 of cab 11 with all of the holes 23 of the rubber base pad in proper alignment with the holes 22 of floor 14. Bushing assemblies 24 are then inserted in place within the holes 21 of flange 16 and bolts 19 together with thick washer 29 are then threaded into hole 20 and tightened into position. As explained above, a plurality of such bolts are utilized, and a typical cab structure will use nineteen of such bolts and associated structures. However, it will be appreciated that any desired number may be provided depending upon the size of the cab to be mounted and other design considerations.

Figure 2:
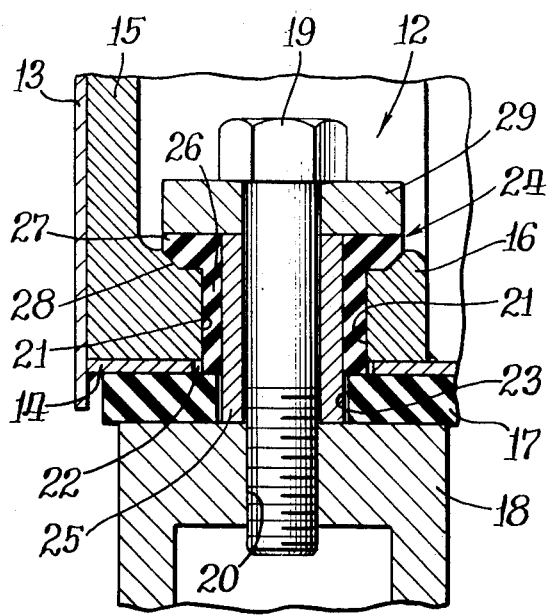
FIG. 2 is an enlarged sectional view of a portion of the fastening device of this invention substantially as seen in the plane of line II—II of FIG. 1.

In the embodiment of FIGS. 1 and 2, the cab is fastened with the fastening devices disposed internally of the cab and through the floor thereof, however, it is within the scope of the invention to fasten the cab externally in whole or in part with such fastening devices not going through the floor of the cab. A typical mounting means in accordance with the external embodiment of the invention is shown in FIG. 3, where corresponding numbers are utilized to illustrate corresponding parts.

Figure 3:
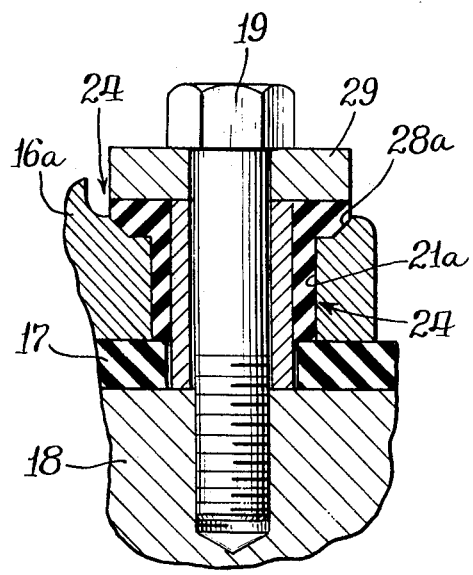
FIG. 3 is a cross-sectional view similar to that of FIG. 2, but showing an alternate form of the invention.

Thus, in FIG. 3, the cab is provided with a flange member 16a, which is welded to the cab externally thereof, and flange member 16a is provided with a plurality of bore holes 21a and recesses 28a, which are similar in configuration to flange 16 and its bore holes 21 and recesses 28. The rubber pad 17 is disposed between the flange 16a and the frame 18 of the vehicle as shown in FIG. 3. If desired, this resilient pad wil also extend under the floor of the cab in any locations where vehicular support is available to provide a completed sandwich. Bolt 19 and bushing assembly 24 are provided as in the embodiment of FIG. 2, and are assembled and operate in substantially the same manner.

From the foregoing description it is seen that an improved resilient mounting means is provided for a protection cab or the like, which substantially completely isolates cab from direct noise and vibration generated in the vehicle, yet which is comparatively simple to assemble and maintain, while maintaining all of the required protection characteristics.

What is claimed is:

1. A cushioned fastening device for mounting protective cabs and the like on a vehicle, comprising a rubber-like base pad disposed between the vehicle and the cab, securing means for holding the cab securely on the vehicle over said base pad, a metallic cylindrical spacer, a rubber bushing bonded to the outer surface of said spacer and on said securing means to provide a complete dampening barrier between the cab and the main body of the vehicle, members at the lower end of the cab formed to receive the securing means and said rubber bushing, said bushing having a flanged section at the upper end thereof formed to fit over said members of the cab, the securing means comprises a bolt and washer assembly sized to fit through said spacer and threadably engage the frame of the vehicle, and in which the members of the cab have accurately machined vertically oriented bore holes extending therethrough toward said frame and sized to receive said rubber bushing, and in which each bore hole has an annular recess at the upper end thereof sized to receive the flanged portion of said rubber bushing, whereby the bolt and the washer assembly will be above and in close proximity to said recess in said members upon complete assembly of said fastening device with said washer overlapping the members of the cab above said recess and around said hole and squeezes the flanged section of the bushing in said annular recess against said member of the cab and is accurately positioned by the metallic cylindrical spacer disposed with one end abutting the bolt and washer assembly and the other end abutting the frame of the vehicle, whereby the cab is securely held in the event of turnover or the like, because only slight movement is permitted before strong metal-to-metal contact is obtained.

2. A cushion fastening device as defined in claim 1, in which the rubber-like pad is disposed substantially completely between said members and the frame of the vehicle, with the resilient pad being disposed substantially around and near the periphery of the cab, whereby compression forces on the pad are spread out and minimized.

3. A cushion fastening device for mounting a protective cab and the like on a vehicle, comprising: mounting flange members provided over the floor of the cab of a vehicle, a rubber-like cushioned base pad disposed between said mounting flanges of the cab and the abutting portion of the vehicle, whereby the cushioned pad is sandwiched between the floor of the cab and the frame of the vehicle, securing means in the form of a plurality of threaded bolts each having a shank and a head and washer assembly for holding the cab assembly on the vehicle, a metallic cylindrical spacer fitting over each of said bolt shanks, a rubber bushing bonded to the outer surface of each of said spacers, each of said bushings having a flanged section at the upper end thereof, each of said flange members of the cab having a vertically oriented bore hole therethrough sized to receive said rubber bushings with recesses at the upper surfaces thereof formed and sized for receiving the flange portion of the bushing, said cushioned base pad being formed with holes sized to receive said cylindrical spacers, said vehicle being provided with threaded bore holes for receiving the threaded bolt shanks whereby the bolt head and washer assembly is disposed above and in close proximity to but out of contact with the recesses in said flange members, said bolt and washer assembly being provided strong enough to maintain the cab in position when subjected to undue stresses sufficient to force the bolt head and washer assembly against said flange member.

4. A cushion fastening device as defined in claim 3, in which the flanged portion of the bushing is held in compression in the assembled device.

* * * * *